US012233820B2

(12) United States Patent
Krishnan et al.

(10) Patent No.: US 12,233,820 B2
(45) Date of Patent: Feb. 25, 2025

(54) VEHICLE SENSOR ASSEMBLY

(71) Applicant: Ford Global Technologies, LLC, Dearborn, MI (US)

(72) Inventors: Venkatesh Krishnan, Canton, MI (US); Rashaun Phinisee, Ypsilanti, MI (US); Kunal Singh, Farmington Hills, MI (US); Raghuraman Surineedi, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1191 days.

(21) Appl. No.: 17/029,727

(22) Filed: Sep. 23, 2020

(65) Prior Publication Data

US 2022/0089129 A1  Mar. 24, 2022

(51) Int. Cl.
| | | |
|---|---|---|
| *B60S 1/52* | (2006.01) | |
| *B60R 11/04* | (2006.01) | |
| *B60S 1/48* | (2006.01) | |
| *B60S 1/54* | (2006.01) | |
| *B60S 1/56* | (2006.01) | |
| *G01S 13/931* | (2020.01) | |
| *G01S 17/931* | (2020.01) | |
| *B60R 11/00* | (2006.01) | |

(52) U.S. Cl.
CPC .............. *B60S 1/52* (2013.01); *B60R 11/04* (2013.01); *B60S 1/48* (2013.01); *B60S 1/54* (2013.01); *B60S 1/56* (2013.01); *G01S 13/931* (2013.01); *G01S 17/931* (2020.01); *B60R 2011/004* (2013.01)

(58) Field of Classification Search
CPC ...... B60S 1/52; B60S 1/48; B60S 1/54; B60S 1/56; B60R 11/04; B60R 2011/004; G02B 27/006
USPC ......................................................... 359/509
See application file for complete search history.

(56) References Cited

U.S. PATENT DOCUMENTS

| | | | |
|---|---|---|---|
| 6,944,908 B2 | 9/2005 | Hoetzer et al. | |
| 10,189,450 B2 | 1/2019 | Rice | |
| 10,286,880 B2* | 5/2019 | Schmidt | .................. B60R 16/08 |
| 11,279,325 B2* | 3/2022 | Sykula | ............... G02B 27/0006 |
| 2013/0094086 A1* | 4/2013 | Bochenek | ................ B60S 1/54 |
| | | | 359/509 |
| 2015/0203077 A1* | 7/2015 | Gokan | ...................... B05B 7/08 |
| | | | 134/102.2 |
| 2015/0353024 A1* | 12/2015 | Cooper | ................... B60R 11/04 |
| | | | 348/148 |
| 2016/0375876 A1* | 12/2016 | Silc | ........................... B60S 1/54 |
| | | | 134/37 |
| 2018/0267297 A1* | 9/2018 | Barthel | .............. G02B 27/0006 |
| 2018/0361997 A1 | 12/2018 | Schmidt et al. | |
| 2020/0406274 A1* | 12/2020 | Schulz-Weiling | ........ B08B 3/02 |
| 2021/0146406 A1* | 5/2021 | Sykula | .................. G01S 7/4813 |
| 2022/0041139 A1* | 2/2022 | Surineedi | .................. B60S 1/56 |

(Continued)

*Primary Examiner* — Ricky D Shafer
(74) *Attorney, Agent, or Firm* — Frank A. MacKenzie; Brooks Kushman P.C.

(57) ABSTRACT

An assembly includes a base. The assembly includes an object detection sensor. The assembly includes a deflector extending upward from the base in front of the object detection sensor. The deflector is configured to direct ram air away from the object detection sensor. The assembly includes a nozzle supported by the deflector and aimed at the object detection sensor.

19 Claims, 5 Drawing Sheets

(56) References Cited

U.S. PATENT DOCUMENTS

2022/0057509 A1* 2/2022 Sykula .................... G01S 17/10
2022/0066032 A1* 3/2022 Glickman ................. B08B 3/02

* cited by examiner

VEHICLE SENSOR ASSEMBLY

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

Vehicles, such as autonomous or semi-autonomous vehicles, typically include a variety of sensors. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices. Sensor operation can be affected by obstructions, e.g., dust, snow, insects, etc., as well as by degradation of features of the sensor window or lens caused by the environment.

DETAILED DESCRIPTION

Figure 1:
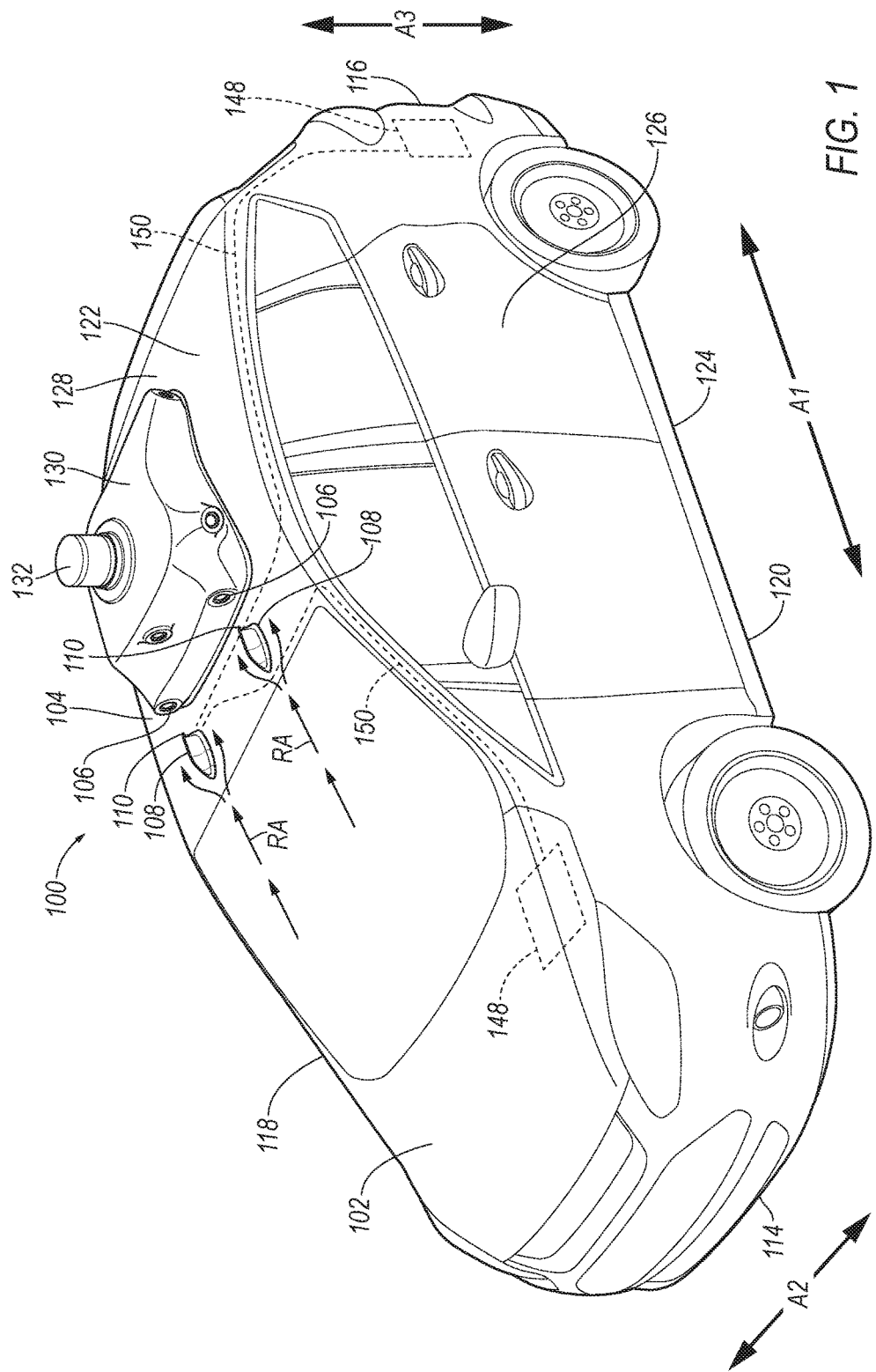
FIG. 1 is a perspective view of a vehicle with a sensor assembly.
Figure 2:
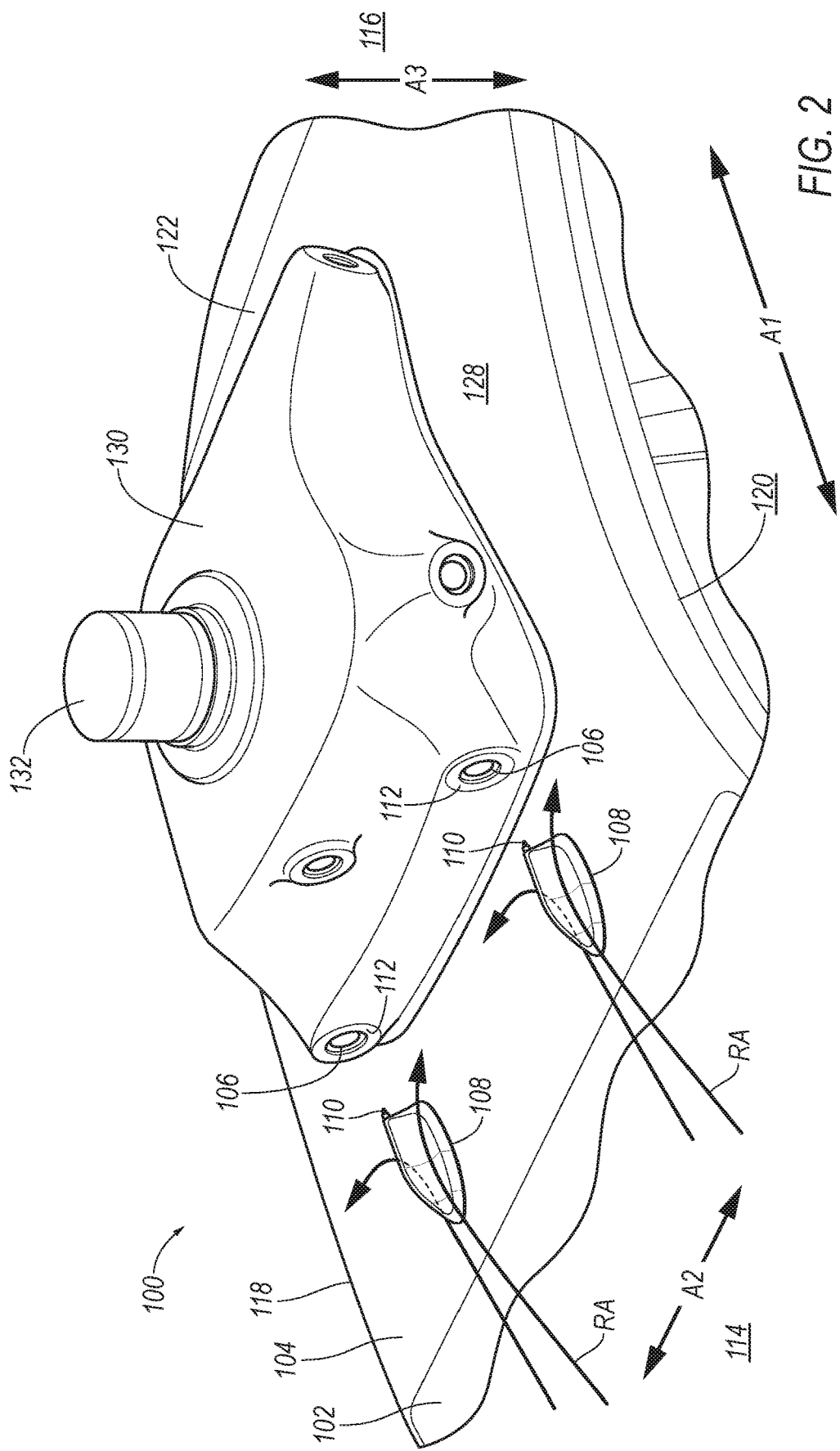
FIG. 2 is a perspective view of a roof of the vehicle with the sensor assembly.

An assembly includes a base. The assembly includes an object detection sensor. The assembly includes a deflector extending upward from the base in front of the object detection sensor. The deflector is configured to direct ram air away from the object detection sensor. The assembly includes a nozzle supported by the deflector and aimed at the object detection sensor.

The deflector may include a first deflection surface configured to direct ram air up and right of the object detection sensor and a second deflection surface configured to direct ram air up and left of the object detection sensor.

The first deflection surface and the second deflection surface may be concave.

The deflector may include a rear surface, and the nozzle may be at the rear surface.

The rear surface may have a peak, and the nozzle may be at the peak.

The deflector may include a top edge that extends from a front of the deflector to the peak.

The deflector may be spaced from the object detection sensor along a vehicle longitudinal axis.

The deflector may be elongated along the vehicle longitudinal axis.

The deflector may include a top edge extending along the vehicle longitudinal axis.

The top edge may be convex.

The assembly may include a fluid delivery system in fluid communication with the nozzle.

The fluid delivery system may provide air and liquid to the nozzle.

The assembly may include a second fluid delivery system in fluid communication with the nozzle.

The assembly may include a second object detection sensor spaced from the object detection sensor along a lateral axis, wherein the object detection sensor and the second object detection sensor are cameras oriented to collect stereoscopic images.

The assembly may include a second deflector supported in front of the second object detection sensor.

The assembly may include a second nozzle supported by the second deflector and aimed at the second object detection sensor.

The object detection sensor may define a field of view having a lateral center, and the deflector may be at the lateral center of the field of view.

The deflector may define a turbulent zone, and the object detection sensor may be in the turbulent zone.

The base may be a vehicle roof, and the deflector may be supported by the vehicle roof.

The assembly may include a sensor housing, and the object detection sensor may be supported by the sensor housing.

With reference to FIGS. 1-4, wherein like numerals indicate like parts throughout the several views, an assembly 100 for collecting data to autonomously operate a vehicle 102 includes a base 104. The assembly 100 includes one or more object detection sensors 106, such as cameras. The assembly 100 includes one or more deflectors 108 extending upward from the base 104 in front of the object detection sensors 106. The deflectors 108 are configured to direct ram air RA away from the object detection sensors 106. A nozzle 110 is supported by each of the deflectors 108. The nozzles 110 are aimed at the object detection sensors 106.

The deflectors 108 and nozzles 110 help maintain clear fields of view FV of the object detection sensors 106. Each object detection sensor 106 defines a field of view FV (shown in FIGS. 4 and 5). The field of view FV is a volume from which light, or other datable medium, is detectable by the respective object detection sensor 106. The object detection sensors 106 may have fields of view FV through the windows 112. In other words, light may pass through the window 112 and be detected by the object detection sensor 106. Each field of view FV may have a lateral center LC. The lateral center LC is generally equidistant from a right edge and a left edge of the respective field of view FV, e.g., along the lateral axis A2 of the vehicle 102.

For example, airborne contaminants, such as dirt, insects, etc., may be urged away from the object detection sensors 106 by the ram air RA that is directed by the deflectors 108. As another example, the nozzles 110 may provide washer fluid to windows 112 or the like in the fields of view FV of the object detection sensors 106.

The vehicle 102 may be any suitable type of automobile, e.g., a passenger or commercial automobile such as a sedan, a coupe, a truck, a sport utility vehicle, a crossover vehicle, a van, a minivan, a taxi, a bus, etc. The vehicle 102, for example, may be an autonomous vehicle. In other words, the vehicle 102 may be autonomously operated such that the vehicle 102 may be driven without constant attention from a driver, i.e., the vehicle 102 may be self-driving without human input.

The vehicle 102 defines a longitudinal axis A1 extending between a front 114 and a rear 116 of the vehicle 102. The vehicle 102 defines a lateral axis A2 extending between a right side 118 and a left side 120 of the vehicle 102. The vehicle 102 defines a vertical axis V3 extending between a top 122 and a bottom 124 of the vehicle 102. The longitudinal axis A1, the lateral axis A2, and the vertical axis V3 may be perpendicular to each other.

The vehicle 102 may include a body 126. The body 126 includes body panels partially defining an exterior of the vehicle 102. The body 126 panels may present a class-A surface, e.g., a finished surface exposed to view by a customer and free of unaesthetic blemishes and defects. The body 126 panels include, e.g., a roof 128, etc.

The vehicle 102 may include a sensor housing 130. The sensor housing 130 is attachable to the vehicle 102, e.g., to one of the body panels of the vehicle 102, e.g., the roof 128. The object detection sensors 106 and other sensors 132 are supported by and/or disposed in the sensor housing 130. The sensor housing 130 may enclose and protect operational components of the object detection sensors 106 and the sensors 132. The sensor housing 130 may be shaped to be attachable to the roof 128, e.g., may have a shape matching a contour of the roof 128. The sensor housing 130 may be attached to the roof 128, which can provide the object detection sensors 106 and other sensors 132 with an unobstructed field of view FV of an area around the vehicle 102. The sensor housing 130 may be formed of, for example, plastic or metal.

The sensor housing 130 may include one or more windows 112. The windows 112 may be fixed relative to and mounted to the sensor housing 130. The windows 112 are transparent with respect to a medium that the object detection sensors 106 and/or other sensors 132 are capable of detecting, e.g., visible light. For example, the windows 112 can be, e.g., two layers of glass attached to a vinyl layer; polycarbonate, etc.

Object detection sensors 106 may include a variety of devices such as are known to provide data indicating detected objects to the vehicle computer, e.g., from the respective field of views FV. For example, the object detection sensors 106 may include Light Detection And Ranging (LIDAR) sensors that provide relative locations, sizes, and shapes of objects surrounding the vehicle. As another example, the object detection sensors 106 may include radar sensors that provide data to indicating locations of the objects, second vehicles, etc., relative to the location of the vehicle. The object detection sensors 106 may further alternatively or additionally, for example, include camera(s), e.g., front view, side view, etc., providing images from an area surrounding the vehicle. The camera includes an image sensor, such as a CCD sensor or a CMOS sensor, to generate data from light that is detected by the camera. The image may be specified in the data as an array of pixels having different values of color, brightness, etc. The object detection sensors 106 may provide the data to a computer, e.g., via a communication network, such as a vehicle bus or the like. In the context of this disclosure, an object is a physical, i.e., material, item that can be represented by physical phenomena (e.g., light or other electromagnetic waves, or sound, etc.) detectable by object detection sensors 106. Thus, vehicles, as well as other items including as discussed below, fall within the definition of "object" herein.

The object detection sensors 106 may include a pair of the cameras spaced from each other along the lateral axis A2 and that face the front 114 of the vehicle 102, i.e., as forward-facing cameras. Such pair of cameras may collect stereoscopic images, e.g., for determining a range from the vehicle 102 to an object in identified in the stereoscopic images detected by the pair of cameras.

The other sensors 132 may include a variety of devices such as are known to provide data, e.g., for autonomously operating the vehicle 102. For example, the other sensors 132 may include Light Detection And Ranging (LIDAR) vehicle sensor(s), etc., disposed on the top 122 of the vehicle 102, behind a vehicle front windshield, around the vehicle 102, etc., that provide relative locations, sizes, and shapes of objects surrounding the vehicle 102. As another example, one or more radar vehicle sensors fixed to vehicle bumpers may provide data to provide locations of the objects, second vehicles, etc., relative to the location of the vehicle 102.

Figure 3:
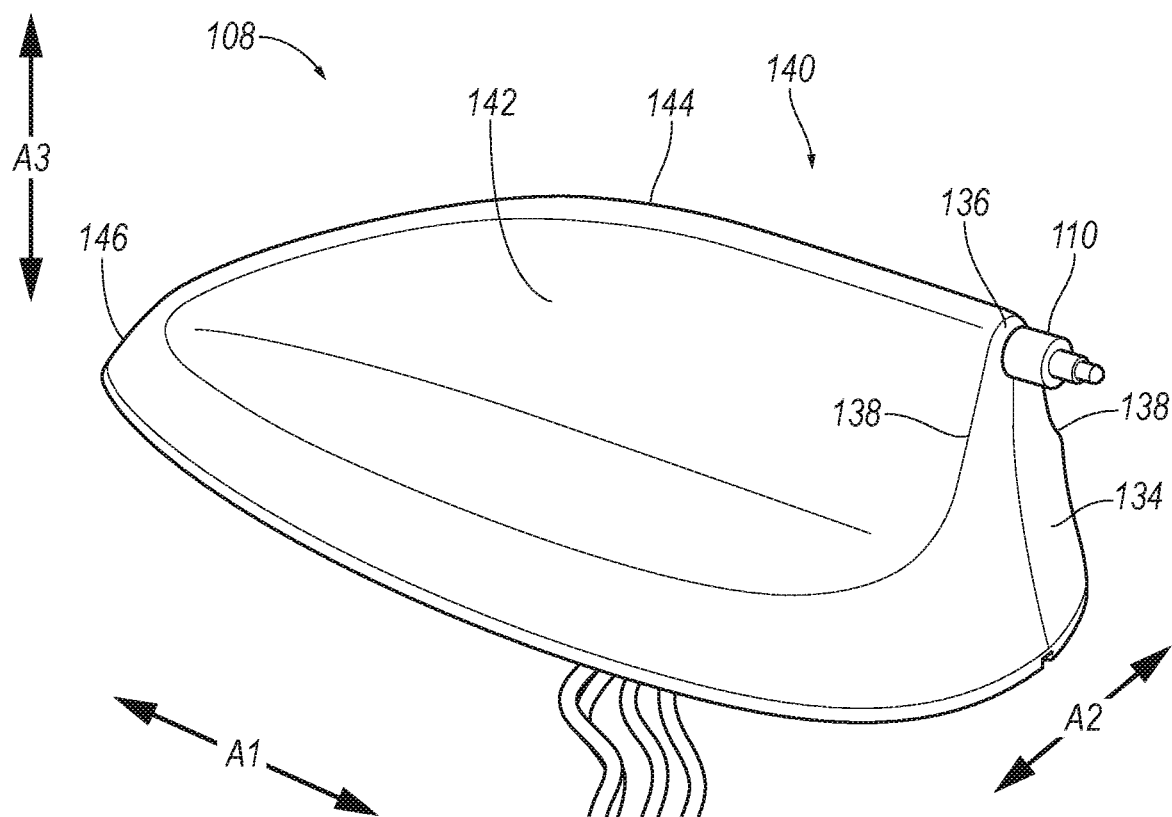
FIG. 3 is a perspective view of a deflector of the sensor assembly.
Figure 4:
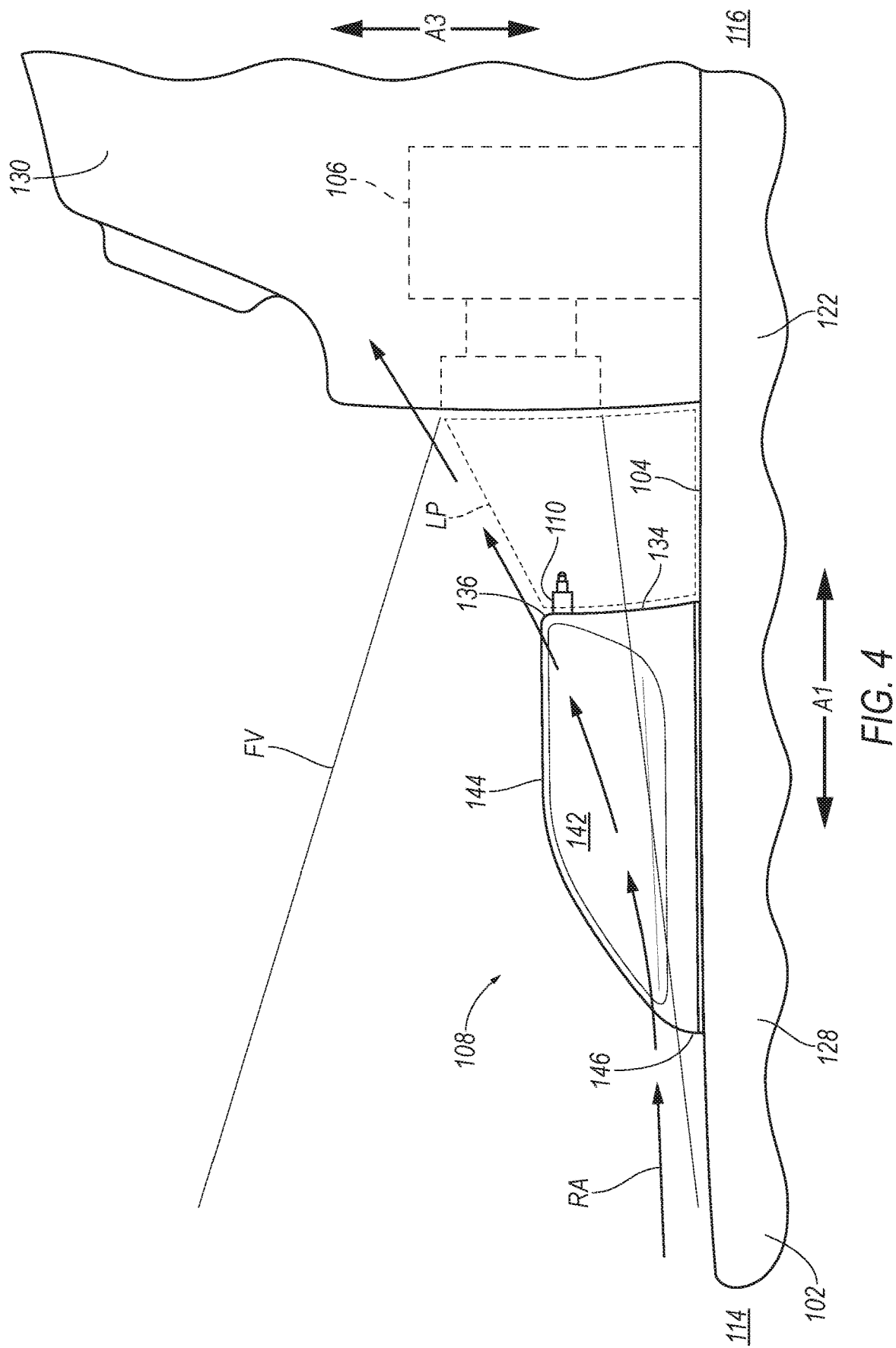
FIG. 4 is a side view of the roof of the vehicle with the sensor assembly.
Figure 5:
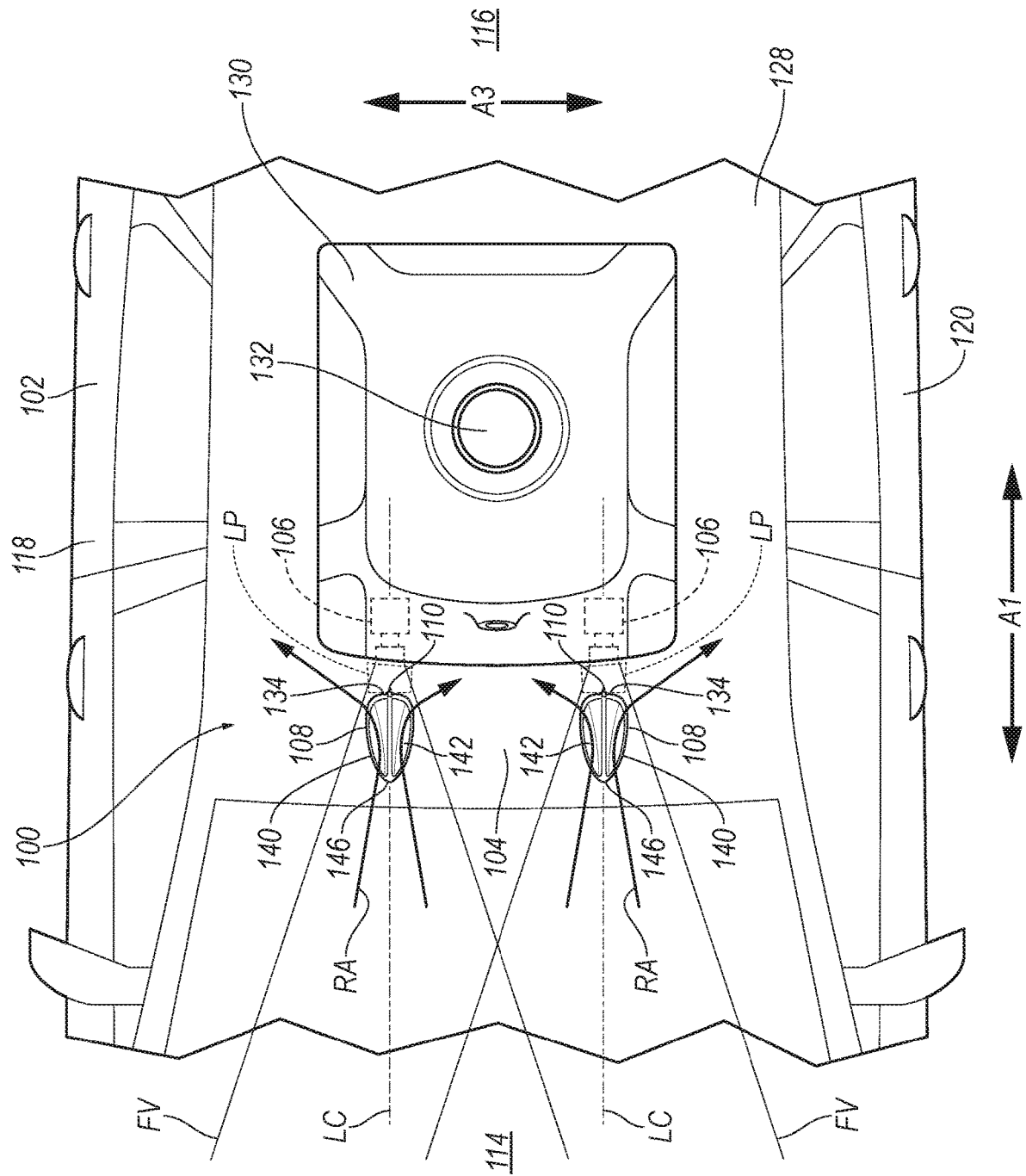
FIG. 5 is a top view of the roof of the vehicle with the sensor assembly.

With reference to FIGS. 3-5, the deflectors 108 are configured to direct ram air RA away from the object detection sensors 106. For example, each object detection sensor 106 may be in a turbulent zone TP defined by a respective one of the deflectors 108 (discussed further below). A pair of deflectors 108 may be spaced from each other along the lateral axis A2 of the vehicle 102, e.g., one the deflectors 108 may be in front of each of the object detection sensors 106 that are cameras that collect stereoscopic images. Such pair of deflectors 108 may be at the lateral centers LC of the fields of view FV of the pair of object detection sensors 106, e.g., the deflectors 108 and the lateral centers LC may have common positions along the lateral axis A2 of the vehicle 102. The deflectors 108 may be spaced from the object detection sensors 106 along the longitudinal axis A1 e.g., between the front 114 of the vehicle 102 and the object detection sensors 106. The deflectors 108 may be spaced from the sensor housing 130 along the longitudinal axis A1. The deflectors 108 extend upward from the base 104 in front of the object detection sensor 106. The base 104 supporting the deflectors 108 may be the roof 128 or other suitable structure of the vehicle 102. For example, the deflectors 108 may extend from the roof 128 and away from the top 122 and bottom 124 of the vehicle 102 along the vertical axis V3.

Turning to FIGS. 3-5, each deflector 108 can include a rear surface 134. The rear surface 134 may extend away from the base 104 along the vertical axis V3, e.g., to a peak 136 of the rear surface 134. The peak 136 of the rear surface 134 is distal from the base 104. In others, the peak 136 may be farther from the base 104 than a remainder of the rear surface 134. The rear surface 134 may extend along the lateral axis A2, e.g., from a rear edge 138 of a first deflection surface 140 at a right side of the deflector 108 to a rear edge 138 of a second deflection surface 142 at a left side of the deflector 108. The rear surface 134 may face the rear 116 of the vehicle 102. The rear surface 134 may face the sensor housing 130. In other words, a line extending normally from the rear surface 134 may extend away from the rear surface 134 toward the sensor housing 130 and/or rear 116 of the vehicle 102, e.g., along the longitudinal axis A1.

The deflector 108 can include a top edge 144. The top edge 144 is at an uppermost position on the deflector 108, e.g., relative the vertical axis V3. The top edge 144 may extend from a front end 146 of the deflector 108 to the rear surface 134, e.g., along the longitudinal axis A1. The top edge 144 may be elongated along, i.e., parallel to the longitudinal axis A1. The top edge 144 may be convex. For example, the top edge 144 may arcuately extend from the front end 146 to the rear surface 134 and bow outward from a center (e.g., of mass, of volume, etc.) of the deflector 108.

The first deflection surface 140 is configured to direct ram air RA up and right of one of the object detection sensors 106 and the second deflection surface 142 is configured to direct ram air RA up and left of such object detection sensor 106, as shown in FIGS. 4 and 5. For example, the first deflection surface 140 and the second deflection surface 142 apply normal forces to ram air RA impacting the deflector 108. Ram is air the moves relative to the vehicle 102, typically moving from in front 114 of the vehicle 102 toward the vehicle 102, and were such air movement is caused by forward travel of the vehicle 102 along a road or the like. The normal forces applied by the deflector 108 may direct the ram air RA to the sides and above the object detection sensor 106.

The first defection surface and the second deflection surface 142 may extend from the base 104 to the top edge 144. The first deflection surface 140 may be on opposite sides of the top edge 144. In other words, the top edge 144 may be between the first defection surface and the second deflection surface 142, e.g., along the lateral axis A2.

The first deflection surface 140 and the second deflection surface 142 may be concave. For example, the first defection surface and the second deflection surface 142 may accurately extend from the base 104 to the top edge 144 and bow toward the center (e.g., of mass, of volume, etc.) of the deflector 108. The concave shape of the first deflection surface 140 and the second deflection surface 142 may scoop ram air RA to redirect such air to the sides and above the object detection sensor 106.

Each deflector 108 may be elongated along the longitudinal axis A1 of the vehicle 102. In other words, a length of the deflector 108 along the longitudinal axis A1 may be greater than a width of the deflector 108 along the lateral axis A2 and a height of the deflector 108 along the vertical axis V3. The length and the width of the deflector 108 may be measured at the base 104, e.g., between the front end 146 of the deflector 108 and the rear surface 134 and between the first deflection surface 140 and the second deflection surface 142. The height of the deflector 108 may be between the base 104 and an uppermost point of the top edge 144 the deflector 108 above the base 104 along the vertical axis V3.

The deflector 108 defines the turbulent zone TP. The turbulent zone TP is a volume having air at a relatively higher turbulence than air proximate the turbulent zone TP. For example, air in the turbulent zone TP may have a higher turbulence that ram air RA directed by the deflector 108 and bordering the turbulent zone TP. Turbulent air in the turbulent zone TP is less likely to redirect fluid from the nozzle 110, e.g., compared to air than is relatively less turbulent and more laminar. The turbulent zone TP may be defined when the vehicle 102 is traveling within a threshold speed range, e.g., 50 to 150 kilometers per hour. A lower bound of the threshold speed range may be a speed at which ram air RA could disrupt and/or redirect fluid flow from the nozzle 110. An upper end of the threshold speed range may be a maximum expected traveling speed of the vehicle 102, i.e., the greatest speed at which the vehicle 102 is expected to travel and determined based on vehicle performance capabilities, specified by regulations such as those to operate on public roadways, etc. The turbulent zone TP defined by the deflector 108 may be identified with wind tunnel testing, computer modeling, etc.

One or more nozzles 110 are supported by each of the deflectors 108. Each nozzle 110 is aimed at one of the object detection sensors 106, e.g., such that fluid sprayed by the nozzle 110 may contact the respective object detection sensor 106, the window 112 in front 114 of such object detection sensor 106, etc. For example, one nozzle 110 may be supported by one of the deflectors 108 and aimed at one of the cameras oriented to collect stereoscopic images, and another nozzle 110 can be supported may the other deflector 108 and aimed at the other camera oriented to collect stereoscopic images. The nozzles 110 may be supported at the rear surfaces 134 of the deflectors 108, e.g., at the peaks 136. In other words, the nozzles 110 may be supported at the rear surfaces 134 between the first deflection surface 140 and the second deflection surface 142 and proximate the top edge 144. Each nozzle 110 may point toward the rear 116 of the vehicle 102 and into the turbulent zone TP defined by the respective deflector 108 supporting such nozzle 110. Pointing the nozzle 110 into the turbulent zone TP may enable more accurate spray of fluid onto the object detection sensor 106, e.g., compared to spray of fluid outside the turbulent zone TP.

One or more fluid delivery systems in fluid communication with nozzles 110, i.e., to provide air and/or liquid, such as washer fluid, to the nozzles 110. For example, one fluid delivery system 148 may be proximate the front 114 of the vehicle 102, and another fluid delivery system 148 may be proximate the rear 116 of the vehicle 102. Each of the fluid delivery systems may include a fluid pump, air compressor, liquid reservoir, pressurized storage tank, check valves, solenoid valves, and/or other suitable structure. The fluid delivery systems may be in fluid communication with the nozzles 110 via tubing 150 and/or any suitable structure. The fluid delivery systems may be in electronic communication with the computer, e.g., via the communication network. The fluid delivery systems may provide fluid to one or more of the nozzle 110 in response to a command from the computer.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
a base;
an object detection sensor;
a deflector extending upward from the base in front of the object detection sensor, the deflector configured to direct ram air away from the object detection sensor, the deflector including a first deflection surface configured to direct ram air up and right of the object detection sensor and a second deflection surface configured to direct ram air up and left of the object detection sensor; and
a nozzle supported by the deflector and aimed at the object detection sensor.

2. The assembly of claim 1, wherein the first deflection surface and the second deflection surface are concave.

3. The assembly of claim 1, wherein the deflector includes a rear surface, the nozzle at the rear surface.

4. The assembly of claim 3, wherein the rear surface has a peak, the nozzle at the peak.

5. The assembly of claim 4, wherein the deflector includes a top edge that extends from a front of the deflector to the peak.

6. The assembly of claim 1, wherein the deflector is spaced from the object detection sensor along a vehicle longitudinal axis.

7. The assembly of claim 6, wherein the deflector is elongated along the vehicle longitudinal axis.

8. The assembly of claim 7, wherein the deflector includes a top edge extending along the vehicle longitudinal axis.

9. The assembly of claim 8, wherein the top edge is convex.

10. The assembly of claim 1, further comprising a fluid delivery system in fluid communication with the nozzle.

11. The assembly of claim 10, wherein the fluid delivery system provides air and liquid to the nozzle.

12. The assembly of claim 10, further comprising a second fluid delivery system in fluid communication with the nozzle.

13. The assembly of claim 1, further comprising a second object detection sensor spaced from the object detection sensor along a lateral axis, wherein the object detection sensor and the second object detection sensor are cameras oriented to collect stereoscopic images.

14. The assembly of claim 13, further comprising a second deflector supported in front of the second object detection sensor.

15. The assembly of claim 1, wherein the object detection sensor defines a field of view having a lateral center, the deflector at the lateral center of the field of view.

16. The assembly of claim 1, wherein the deflector defines a turbulent zone, and wherein the object detection sensor is in the turbulent zone.

17. The assembly of claim 1, wherein the base is a vehicle roof, the deflector supported by the vehicle roof.

18. The assembly of claim 1, further comprising a sensor housing, the object detection sensor supported by the sensor housing.

19. The assembly of claim 1, wherein the nozzle is configured to spray liquid.

\* \* \* \* \*